United States Patent [19]

Jacob et al.

[11] Patent Number: 4,943,888
[45] Date of Patent: Jul. 24, 1990

[54] ELECTRONIC CIRCUIT BREAKER USING DIGITAL CIRCUITRY HAVING INSTANTANEOUS TRIP CAPABILITY

[75] Inventors: Philippe L. Jacob; Sharbel E. Noujaim, both of Clifton Park; Glenn A. Forman, Schenectady, all of N.Y.; John A. Mallick, Bridgeport, Conn.

[73] Assignee: General Electric Company, Schenectady, N.Y.

[21] Appl. No.: 377,373

[22] Filed: Jul. 10, 1989

[51] Int. Cl.[5] .............................................. H02H 2/08
[52] U.S. Cl. ........................................ 361/96; 361/95; 361/97
[58] Field of Search ........................ 361/93, 94, 95, 96, 361/97

[56] References Cited

U.S. PATENT DOCUMENTS

| 4,542,354 | 9/1985 | Robinton et al. | 340/11 D |
| 4,573,037 | 2/1986 | Robinton et al. | 340/347 NT |
| 4,694,373 | 9/1987 | Demeyer | 361/96 |
| 4,766,416 | 8/1988 | Noujaim | 340/347 AD |
| 4,768,018 | 8/1988 | Noujaim | 340/347 AD |

*Primary Examiner*—Derek S. Jennings
*Attorney, Agent, or Firm*—Allen L. Limberg; James C. Davis, Jr.; Marvin Snyder

[57] ABSTRACT

Instantaneous trip capability is provided to an electronic circuit breaker, which is of the type that generates trip signals by accumulating squares of power line current samples and thresholds the accumulation results. Samples of power line current are taken directly from the current transformer and analog-to-digital converter cascade generating them. The analog-to-digital converter is of an oversampling type, using a delta-sigma modulator. The samples are threshold detected against a prescribed threshold value without previous squaring, integration and detection. The threshold detector result is checked for two consecutive overcurrent indications before an instantaneous trip signal is generated.

18 Claims, 2 Drawing Sheets

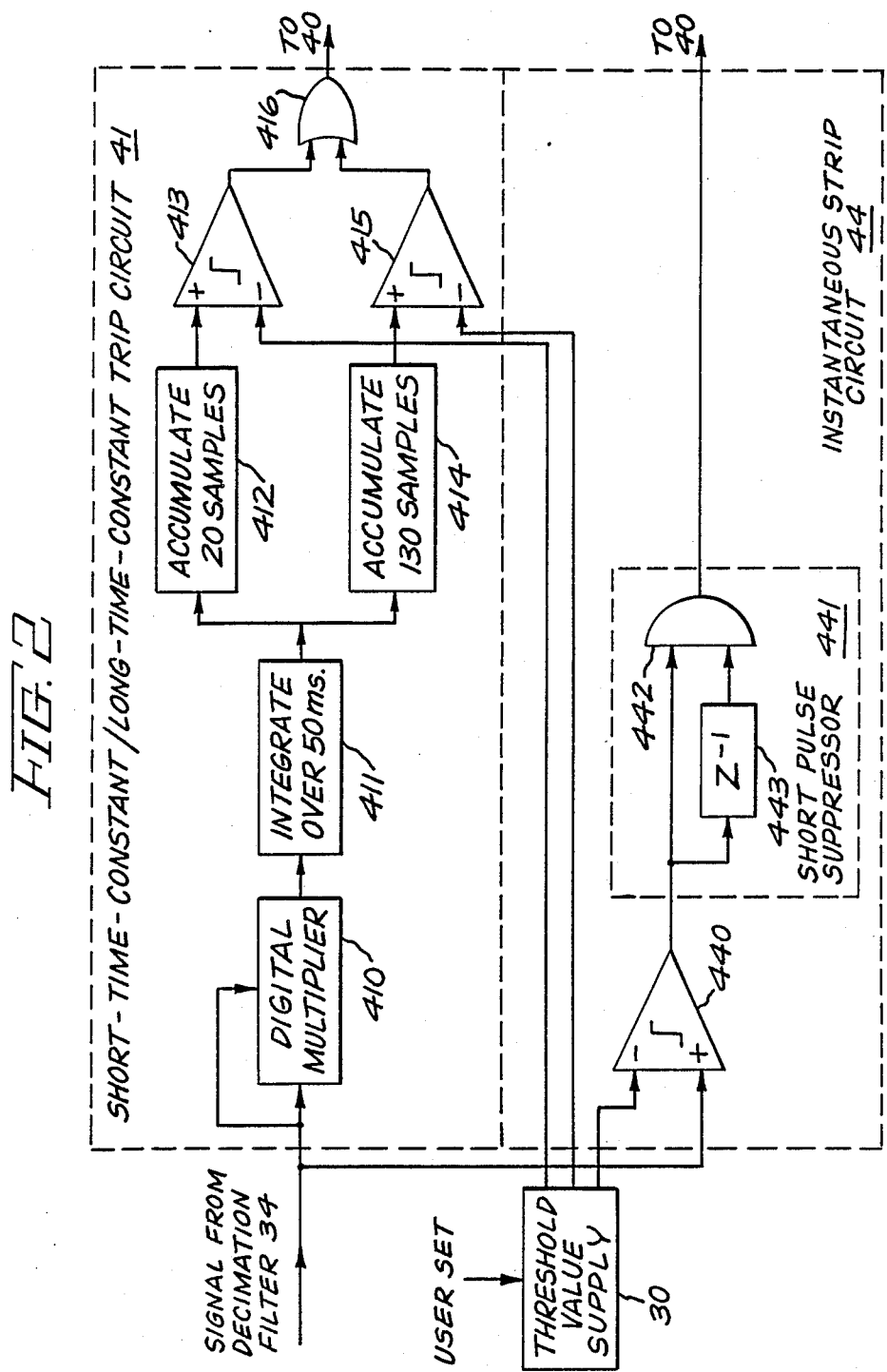

ELECTRONIC CIRCUIT BREAKER USING DIGITAL CIRCUITRY HAVING INSTANTANEOUS TRIP CAPABILITY

The invention relates to electronic circuit breakers and more particularly, to ones using digital electronics to discriminate between sustained overcurrent on the protected line which must be responded to and momentary overcurrent pulses on the protected line which have insufficient energy associated therewith to be harmful and should not be responded to.

BACKGROUND OF THE INVENTION

An electronic circuit breaker using digital circuitry inserts the primary winding of a respective current transformer into each conductor of a power line it protects; and signal at the secondary winding of each current transformer so employed is rectified and converted to digital form. The resulting samples are squared by means of digital multiplication, and integrated over a time period fifty milliseconds or so long. The integrated squared samples are then accumulated over prescribed periods of time and threshold detected to generate a trip signal, should overcurrent occur over too long an interval of time. A trip signal actuates an electromechanical switch for interrupting the flow of current through each conductor of the power line. Accumulation has been done over a relatively small numbered plurality of samples and the accumulations threshold detected at a relatively high level, to generate a short-time-constant trip signal; and accumulation has been done over a relatively large-numbered plurality of samples and the accumulation threshold detected at a relatively lower level to generate a long-time-constant trip signal as well.

The generation of trip signals as thusfar described is invariably too slow, however, when catastrophic fault conditions are imposed on one or more of the power line conductors. The electromechanical switches used to interrupt the power line conductors can respond to a trip signal in about fifty milliseconds, and it is desired to generate "instantaneous" trip signals in a fraction of that time. One millisecond is the commercial requirement for the analog-to-digital converter and threshold detection apparatus in an electronic circuit breaker to generate instantaneous trip signal. It is desirable that such apparatus be powered directly from the power line conductors the circuit breaker protects, as pointed out by S. E. Noujaim in U.S. Pat. No. 4,768,018 issued Aug. 30, 1989; entitled "ANALOG TO DIGITAL CONVERTER FOR AN ELECTRONIC CIRCUIT BREAKER WITH OUT-OF-SUPPLY-RANGE INPUT SIGNALS" and assigned to General Electric Company. A typical power-up time for such a supply is about 400 microseconds, which leaves only about 600 microseconds thereafter for the analog-to-digital converter and threshold detection apparatus to generate the instantaneous trip signal. So about 1600 conversion results or more have to be generated per second for instantaneous trip to be fast enough to be commercially acceptable. Such rapid conversion rates reduce the amount of time integration of power line current response that can be done in the analog-to-digital converter and threshold detection apparatus. This makes it likely that short-duration, high-current transients on the power line conductors will generate instantaneous trip signals, even when their energy content is insufficiently large to be of concern. That is, "false" trips become a significant problem. An aspect of the invention is reducing the likelihood of false trips by requiring at least two consecutive conversion results indicative of over-current to occur before an instantaneous trip signal is generated. When this is done, about 3200 conversion results or more have to be generated per second for instantaneous trip to be fast enough to be commercially acceptable.

SUMMARY OF THE INVENTION

In an electronic circuit breaker embodying the invention in a principal one of its aspects, an oversampled delta-sigma modulator followed by a decimation filter is used as an analog-to-digital converter. The oversampled delta-sigma modulator supplies conversion results in bit-serial form to the digital multiplier used for squaring signal samples prior to accumulation and threshold detection procedures.

In an electronic circuit breaker embodying the invention in another of its aspects, instantaneous trip signals are generated in the digital electronic circuit breaker of the present invention by determining when a prescribed threshold value is exceeded by the digital samples supplied from the analog-to-digital converter, before the squaring, integration and accumulation procedures associated with generating short-time-constant and long-time-constant trip signals commence. In preferred embodiments of this aspect of the invention, to reduce false trips, two successive samples must exceed the prescribed threshold value before the instantaneous trip signal is generated.

BRIEF DESCRIPTION OF THE DRAWING

FIG. 2 is a more detailed schematic diagram of circuitry for generating short-time-constant, long-time-constant and instantaneous trip signals.

DETAILED DESCRIPTION

Figure 1:
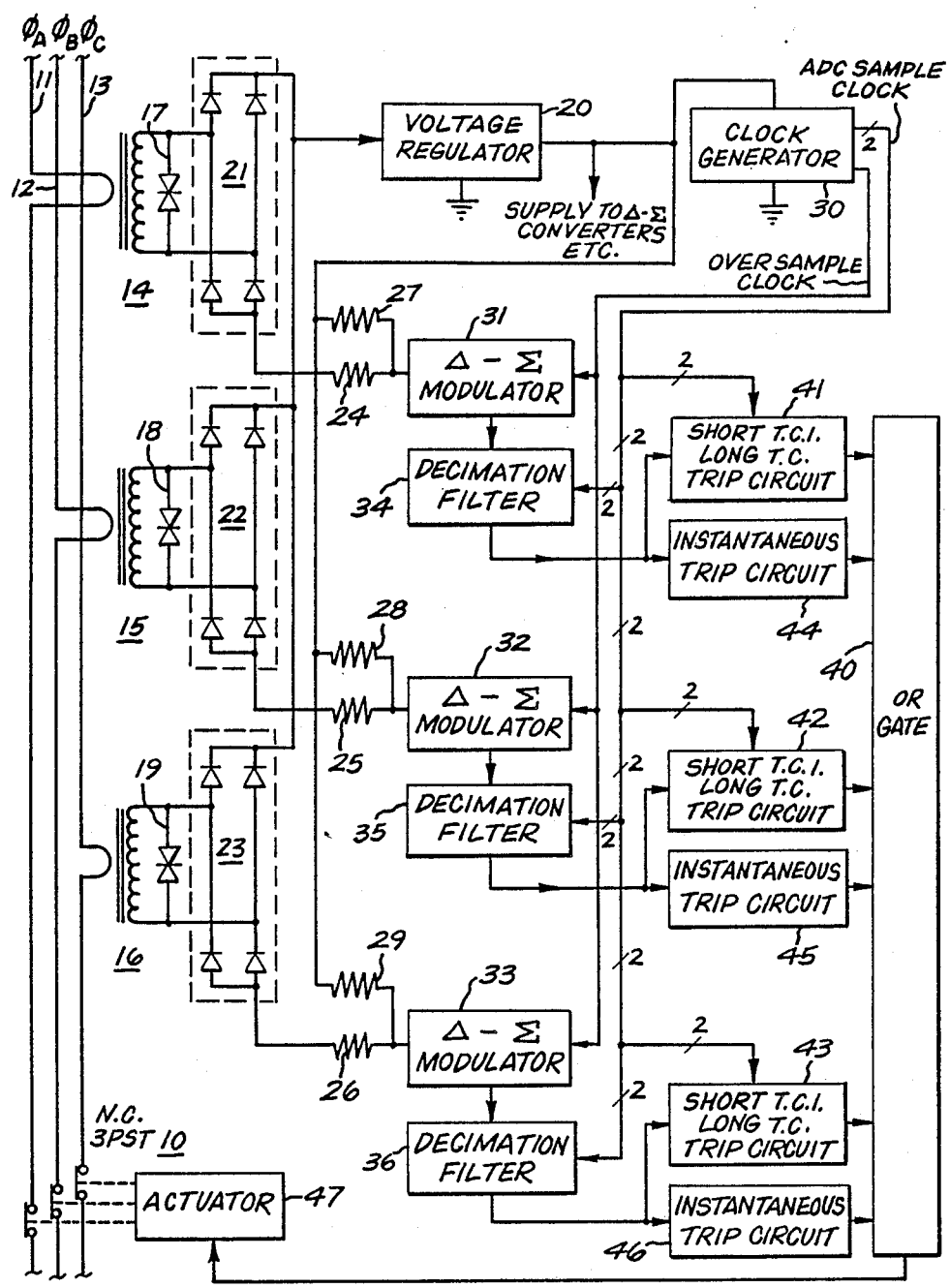
FIG. 1 is an overall schematic diagram of an electronic circuit breaker embodying the invention.

In FIG. 1 a normally closed three-pole/single-throw switch 10 is arranged to interrupt conduction through each of the conductors 11, 12 and 13 supplying phases ΦA, ΦB, and ΦC respectively in a three-phase power line. This interruption is controlled by an electrically tripped electromechanical actuator 47 and occurs responsive to an overcurrent condition being sensed as occurring in one or more of the conductors 11, 12 and 13. The source sides of conductors 11, 12 and 13 can be at the top of FIG. 1 and their load sides at the bottom of FIG. 1. Alternatively, the source sides of conductors 11, 12 and 13 can be at the bottom of FIG. 1 and their load sides at the top of FIG. 1.

Current transformers 14, 15 and 16 have respective primary windings included in conductors 11, 12 and 13, respectively, and have secondary windings across which voltages appear responsive to current flows through their primary windings. The secondary windings of current transformers 14, 15 and 16 are shown with respective avalanche-diode overvoltage protectors 17, 18 and 19. The secondary windings of current transformers 14, 15 and 16 supply their alternating voltages to full-wave-rectifier diode bridges 21, 22 and 23. The positive output voltages of these full-wave rectifier diode bridges 21, 22 and 23 supply a voltage regulator 20 (which may be a shunt regulated type, for example)

that supplies a positive, regulated voltage to the electronic circuitry in the FIG. 1 electronic circuit breaker.

The negative output voltages of these full-wave rectifier diode bridges 21, 22 and 23 are applied via resistors 24, 25 and 26 respectively to the input ports of oversampled $\Delta-\Sigma$ modulators 31, 32 and 33 respectively. The regulated positive voltage from voltage regulator 20 is also applied to the input ports of $\Delta-\Sigma$ modulators 31, 32 and 33 via resistors 27, 28 and 29, respectively, to bring the rectified voltage swings within the analog-to-digital conversion range of the $\Delta-\Sigma$ modulators 31, 32 and 33. This procedure and the specific construction of a $\Delta-\Sigma$ modulator are more particularly described by S. E. Noujaim in U.S. Pat. No. 4,758,018 issued 30 Aug. 1988, entitled "ANALOG TO DIGITAL CONVERTER FOR AN ELECTRONIC CIRCUIT BREAKER WITH OUT-OF-SUPPLY-RANGE INPUT SIGNALS" and incorporated herein by reference.

A clock generator 30 powered by regulated positive voltage from voltage regulator 20 includes a crystal oscillator to generate a master clock frequency. Digital counters count down from this master frequency to generate the oversampling clock signal for the $\Delta-\Sigma$ modulators 31, 32 and 33 and an analog-to-digital (ADC) sample clock. The ADC sample clock can be a bit serial clock comprising a bit rate and a word rate clock supplied on separate lines. By way of example, electronic circuit breakers designed by the inventors have used a 3.56352 MHz oversampling clock signal rate and decimation filters having a 28 decimation factor. Accordingly, the word rate clock is 13.92 kHz in such a design. A bit serial word of 25 bits has been used in the design, so the bit-serial speed of operation is 445.44 kHz, supposing there is no time-division multiplexing of digital hardware.

The digital samples from decimation filters 34, 35 and 36 are supplied to short-time-constant/long-time constant trip signal generating circuits 41, 42 and 43, respectively, as well as to instantaneous trip circuits 44, 45 and 46, respectively. An OR gate 40 responds to a trip signal supplied from any of the circuits 41-46 to forward that trip signal to the electromechanical actuator 47 for causing the normally closed three-pole/single-throw switch 10 to open and interrupt conduction through each of conductors 11, 12 and 13.

FIG. 2 shows more particularly how circuits 41 and 44 (or 42, and 45, or 43 and 46) appear. A user-set threshold value supply supplies three threshold values. A first of these three user-set threshold values is used in developing the short-time-constant trip signals in circuits 41-43. A second of these three user-set threshold values is used in developing the long-time-constant trip signals in circuits 41-43. And a third of these three user-set threshold values is used in developing the instantaneous trip signals in circuits 44-46. The first of these threshold values is normally larger than the second, (e.g., by six times); and the third of these threshold values is not only normally greater than the second (e.g., by twenty times) but also is greater than the first.

The signal from decimation filter 34 is supplied as both multiplier and multiplicand to a digital multiplier 410 for squaring each sample of that signal. The squared samples are supplied to an integrator 411 with fifty millisecond time constant, which may for example be an averager for each sequence of 696 samples at 13.92 KHz word rate. The fifty millisecond integration time corresponds to 2.5 cycles of 50 Hz current, three cycles of 60 Hz current and twenty cycles of 400 Hz current.

Relatively small groups of sequential samples (e.g. twenty in number) are accumulated in an accumulator 412, and the accumulation results are compared in a differential comparator 413 against the first threshold value from supply 50. If and only if the accumulation results exceed the first threshold value does comparator 413 deliver a logic ONE to OR gate 416 and thence to OR gate 40, which ONE is the short-time-constant trip signal. If its accumulation results do not exceed the first threshold value from supply 50, comparator 413 output signal is a logic ZERO.

Relatively large groups of sequential samples (e.g., one-hundred-thirty in number) are accumulated in an accumulator 414, and the accumulation results are compared in a differential comparator 415 against the second threshold value from supply 50. If and only if the accumulation results exceed the second threshold value, does comparator 415 deliver a logic ONE to OR gate 416 and thence to OR gate 40, which ONE is the long-time-constant trip signal. If its accumulation results do not exceed the second threshold value from supply 50, comparator 415 output signal is a logic ZERO.

Instantaneous trip circuit 44 compares signal from decimation filter 34 with the third threshold value in differential comparator 440. There are no delays in making this comparison as would be caused by squaring, integration, or accumulation. To lessen the chance of a one-sample transient pulse condition causing a false trigger a short-pulse suppressor 441 follows differential comparator 440. Each comparison result is ANDed in an AND gate 442 with its predecessor, as temporarily stored in a clocked latch 443. AND gate 442 response is logic ZERO unless any two successive digital samples from decimation filter 34 exceed the third threshold value, which exceptional condition causes AND gate 442 response to be a logic ONE. This logic ONE is the instantaneous trip signal, which is supplied to OR gate 40. Some variation in the short-pulse suppressor is possible, (e.g., ANDing of three successive comparator 440 results may be done to provide short-pulse suppression still less likely to generate false trip signals, at some sacrifice in speed of instant trip response).

One skilled in the art and acquainted with the foregoing disclosure will be enabled to design other embodiments of the invention, and this should be borne in mind when construing the scope of the ensuing claims. For example, electronic circuit breakers for protecting power lines with any number of phases of alternating current and any number of conductors can be constructed in accordance with the invention. Electronic circuit breakers for power lines transmitting direct current can also be constructed in accordance with the invention, by using a chopper in the connections to the primary winding of each current transformer.

What is claimed is:

1. An electronic circuit breaker for an n-conductor power line for alternating currents, n being a positive integer at least one, said electronic circuit breaker comprising:

a corresponding current transformer for each of the n conductors of said power line, each said current transformer having a primary winding interposed in the corresponding conductor of said power line and having a secondary winding from which a signal is supplied responsive to current flowing in the corresponding conductor of said power line;

respective means associated with the secondary winding of each said current transformer for rectifying the signal supplied therefrom to generate a respective rectified signal;

respective analog-to-digital converting means for converting each rectified signal to a respective succession of digital samples during sample periods that recur at a rate of at least 3200 per second;

a respective digital multiplier for multiplying the digital samples in each respective succession by themselves to generate a respective succession of squared samples;

respective means for integrating each succession of squared samples to generate a respective succession of integrated squared samples;

respective means for accumulating each succession of integrated squared samples over at least one plurality of sample periods to generate a respective accumulation result;

means comparing each accumulation result to a corresponding prescribed threshold value for generating a respective trip signal when the prescribed threshold value is exceeded;

means comparing each digital sample from each analog-to-digital converting means to another prescribed threshold value for generating a respective essentially instantaneous response each time that prescribed threshold value is exceeded;

means for generating a respective instant trip signal only responsive to each of said essentially instantaneous responses occurring during every one of a small plurality of successive said recurring sample times;

an OR circuit responding to any said trip signal being generated to generate an actuating signal; and means responsive to said actuating signal for interrupting conduction through said n-conductor power line.

2. An electronic circuit breaker as set forth in claim 1 wherein said means for generating a respective instantaneous trip signal is of a type generating a respective instantaneous trip signal responsive to each of said essentially instantaneous responses occurring during both of two successive ones of said recurring sample periods.

3. An electronic circuit breaker as set forth in claim 1 wherein said respective means for accumulating each succession of integrated squared samples over at least one plurality of sample periods to generate a respective accumulation result comprises:

respective means for accumulating each succession of integrated squared samples over a first plurality of sample periods; and respective means for accumulating each succession of integrated squared samples over a second plurality of sample periods, said second plurality being at least a few times larger than said first plurality and wherein said means for comparing each accumulation result to a corresponding prescribed threshold value is of a type having a higher threshold value for comparing each accumulation result from accumulating each succession of integrated squared samples over said second plurality of sample periods.

4. An electronic circuit breaker as set forth in claim 3 wherein said means for generating a respective instantaneous trip signal is of a type generating a respective instant trip signal responsive to each of said essentially instantaneous responses occurring during both of two successive ones of said recurring sample periods.

5. An electronic circuit breaker as set forth in claim 1, wherein a said rectified signal supplied from said respective means associated with the secondary winding of each said current transformer for rectifying the signal supplied therefrom is applied as energizing power to each said analog-to-digital converting means, to each said digital multiplier, to each said respective means for integrating each succession of squared samples, to each said respective means for accumulating each succession of integrated squared samples over at least one plurality of sample periods, to said means comparing each accumulation result to a corresponding prescribed threshold value, to said means comparing each digital sample from each analog-to-digital converting means to another prescribed threshold value, and to said means for generating a respective instant trip signal.

6. An electronic circuit breaker for an n-conductor power line, n being a positive integer at least one, said electronic circuit breaker comprising:

a corresponding current transformer for each of the n conductors of said power line, each said current transformer having a primary winding interposed in the corresponding conductor of said power line and having a secondary winding from which a signal is supplied responsive to current flowing in the corresponding conductor of said power line;

respective means associated with the secondary winding of each said current transformer for rectifying the signal supplied therefrom to generate a respective rectified signal;

respective analog-to-digital converting means for converting each rectified signal to a respective succession of digital samples during recurring sample periods;

a respective digital multiplier for multiplying the digital samples in each respective succession by themselves to generate a respective succession of squared samples;

respective means for integrating each succession of squared samples to generate a respective succession of integrated squared samples;

respective means for accumulating each succession of integrated squared samples over at least one plurality of sample periods to generate a respective accumulation result;

means comparing each accumulation result to a corresponding prescribed threshold value for generating a respective trip signal when the prescribed threshold value is exceeded;

means comparing each digital sample from each analog-to-digital converting means to another prescribed threshold value for generating a respective essentially instantaneous response each time that prescribed threshold value is exceeded;

means for generating a respective instant trip signal responsive to each of said essentially instantaneous responses occurring during both of two successive ones of said recurring sample times, which means includes means for delaying each of said essentially instantaneous responses for one of said recurring sample periods, and means for ANDing each of said essentially instantaneous responses with itself as delayed by said one recurring sample period to generate a trip signal responsive to that essentially instantaneous response occurring during both of two successive ones of said recurring sample periods;

an OR circuit responding to any said trip signal being generated to generate an actuating signal; and means responsive to said actuating signal for interrupting conduction through said n-conductor power line.

7. An electronic circuit breaker for an n-conductor power line, n being a positive integer at least one, said electronic circuit breaker comprising:

a corresponding current transformer for each of the n conductors of said power line, each said current transformer having a primary winding interposed in the corresponding conductor of said power line and having a secondary winding from which a signal is supplied responsive to current flowing in the corresponding conductor of said power line;

respective means associated with the secondary winding of each said current transformer for rectifying the signal supplied therefrom to generate a respective rectified signal;

respective analog-to-digital converting means for converting each rectified signal to a respective succession of digital samples during recurring sample periods, each which respective analog-to-digital converting means comprises a delta-sigma modulator of the oversampled type having respective input and output ports and sampling the rectified signal supplied to its input port severalfold during each of said recurring sample periods, and a decimation filter having an input port connecting to the output port of said delta-sigma modulator and having an output port for supplying said respective succession of digital samples during recurring sample periods;

a respective digital multiplier for multiplying the digital samples in each respective succession by themselves to generate a respective succession of squared samples;

respective means for integrating each succession of squared samples to generate a respective succession of integrated squared samples;

respective means for accumulating each succession of integrated squared samples over at least one plurality of sample periods to generate a respective accumulation result;

means comparing each accumulation result to a corresponding prescribed threshold value for generating a respective trip signal when the prescribed threshold value is exceeded;

means comparing each digital sample from each analog-to-digital converting means to another prescribed threshold value for generating a respective essentially instantaneous response each time that prescribed threshold value is exceeded;

means for generating a respective instant trip signal responsive to each of said essentially instantaneous responses occurring during every one of a small number of said recurring sample times;

an OR circuit responding to any said trip signal being generated to generate an actuating signal; and means responsive to said actuating signal for interrupting conduction through said n-conductor power line.

8. An electronic circuit breaker as set forth in claim 7 wherein said means for generating a respective instant trip signal is of a type generating a respective instant trip signal responsive to each of said essentially instantaneous responses occurring during both of two successive ones of said recurring sample periods.

9. An electronic circuit breaker as set forth in claim 7 wherein said respective means for accumulating each succession of integrated squared samples over at least one plurality of sample periods to generate a respective accumulation result comprises:

respective means for accumulating each succession of integrated squared samples over a first plurality of sample periods; and respective means for accumulating each succession of integrated squared samples over a second plurality of sample periods, said second plurality being at least a few times larger than said first plurality and wherein said means for comparing each accumulation result to a corresponding prescribed threshold value is of a type having a higher threshold value for comparing each accumulation result from accumulating each succession of integrated squared samples over said first plurality of sample periods than for comparing each accumulation result from accumulating each successive of integrated squared samples over said second plurality of sample periods.

10. An electronic circuit breaker as set forth in claim 9 wherein said means for generating a respective instant trip signal is of a type generating a respective instant trip signal responsive to each of said essentially instantaneous responses occurring during both of two successive ones of said recurring sample periods.

11. An electronic circuit breaker for an n-conductor power line, n being an integer at least one, said electronic circuit breaker comprising:

respective means for providing an analog indication of the amplitude of current flow in each of the n conductors of said power line;

a respective delta-sigma modulator of the oversampled type for converting each of said analog indications into a respective succession of bits indicative of the amplitude of current flow in each of the n conductors in said power line;

means, responding to said successions of bits indicative of the amplitudes of current flow in each of the n conductors in said power line being indicative that any of said current flows is excessive, for generating an actuating signal; and means responsive to said actuating signal for interrupting conduction through said n-conductor line.

12. An electronic circuit breaker as set forth in claim 11 wherein said means for generating an actuating signal includes:

respective means responding to each succession of bits indicative of the amplitude of current flow in one of said n conductors, for generating at a reduced rate digital words descriptive of samples of the squared amplitude of that current flow;

respective means for continuously accumulating a prescribed number of successive said digital words descriptive of samples of the squared amplitude of current flow in each of the n conductors of said power line, to generate respective accumulation results; and means comparing each accumulation result to a prescribed threshold value for generating said actuating signal when said accumulation result exceeds said prescribed threshold value.

13. An electronic circuit breaker as set forth in claim 11 wherein said means for generating an actuating signal includes:
  respective means responding to each succession of digital bits indicative of the amplitude of current flow in one of said n conductors for generating at a reduced rate digital words descriptive of samples of the squared amplitude of that current flow;
  respective means for continuously accumulating with first and second prescribed numbers of successive said digital words descriptive of samples of the squared amplitude of current flow in each of said n conductors, to generate respective accumulation results, said second prescribed number being larger than said first prescribed number;
  respective means, comparing to a first prescribed threshold value each accumulation result from continuously accumulating a first number of digital words for generating a trip signal whenever that said accumulation result exceeds said first prescribed threshold value;
  respective means, comparing to a second prescribed threshold value each accumulation result from continuously accumulating a second number of digital words, for generating a trip signal whenever that said accumulation result exceeds said second prescribed threshold value, said second prescribed threshold value being smaller than said first prescribed threshold value; and
  means responding to any said trip signal being generated for providing said actuating signal.

14. An electronic circuit breaker as set forth in claim 11 wherein said means, responding to said successions of bits indicative of the amplitudes of current flow in each of the n conductors of said power line for generating an actuating signal includes:
  a respective decimation filter responding to each succession of bits indicative of the amplitude of current flow in one of said n conductors for generating at a reduced rate digital words descriptive of samples measuring the amplitude of that current flow; and
  means, responding to the digital words from any of said decimation filters measuring an amplitude of current flow that exceeds a prescribed threshold value a specified number of times, for generating said actuating signal.

15. An electronic circuit breaker as set forth in claim 14 wherein said means, responding to the digital words from any of said decimation filters measuring an amplitude of current flow that exceeds a prescribed threshold value a specified number of times, for generating said actuating signal consists of:
  means responding to the digital words from any of said decimation filters measuring an amplitude of current flow that exceeds a prescribed threshold value a specified plural number of times for generating said actuating signal.

16. An electronic circuit breaker as set forth in claim 15 wherein said means, responding to the digital words from any of said decimation filters measuring an amplitude of current flow that exceeds a prescribed threshold value a specified plural number of times, for generating said actuating signal includes:
  a corresponding comparator for each decimation filter for generating a respective essentially instantaneous response each time the digital word from said decimation filter measures an amplitude of current flow that exceeds said prescribed threshold value to generate an essentially instantaneous response;
  a corresponding means associated with each said comparator for ANDing its current response and a number at least one of previous responses to generate a respective instant trip signal when every one of these responses indicates that said prescribed threshold value is exceeded; and
  an OR circuit responding to any said trip signal being generated to generate said actuating signal.

17. An electronic circuit breaker as set forth in claim 11 wherein said means, responding to said successions of bits indicative of the amplitudes of current flow in each of the n conductors of said power line, for generating an actuating signal includes:
  respective digital-word-generating means responding to each succession of bits indicative of the amplitude of current flow in one of said n conductors for generating at a reduced rate digital words descriptive of samples measuring the amplitude of that current flow and descriptive of samples measuring the squared amplitude of that current flow;
  respective means, responding to the digital words from each digital-word-generating means measuring the amplitude of current flow in a respective one of the n conductors of said power line, for generating an instant trip signal whenever a pair of successive ones of those words both exceed a first prescribed threshold value;
  respective means for continuously accumulating a prescribed number of successive said digital words descriptive of samples of the squared amplitude of current flow in each of the n conductors of said power line, to generate respective accumulation results;
  means comparing each accumulation result to a second prescribed threshold value for generating a trip signal when said accumulation result exceeds said second prescribed threshold value; and
  means responding to any said trip signal being generated for providing said actuating signal.

18. An electronic circuit breaker as set forth in claim 11 wherein said means, responding to said successions of bits indicative of the amplitudes of current flow in each of the n conductors of said power line, for generating an actuating signal includes:
  respective digital-word-generating means responding to each succession of bits indicative of the amplitude of current flow in one of said n conductors for generating at a reduced rate digital words descriptive of samples measuring the amplitude of that current flow and descriptive of samples measuring the squared amplitude of that current flow;
  respective means, responding to the digital words from each digital-word-generating means measuring the amplitude of current flow in a respective one of the n conductors of said power line, for generating an instant trip signal whenever a pair of successive ones of those words both exceed a first prescribed threshold value;
  respective means for continuously accumulating with first and second prescribed numbers of successive said digital words descriptive of samples of the squared amplitude of current flow in each of said n conductors, to generate respective accumulation results, said second prescribed number being larger than said first prescribed number;

respective means, comparing to a second prescribed threshold value each accumulation result from continuously accumulating a first number of digital words for generating a trip signal whenever that said accumulation result exceeds said second prescribed threshold value, and second prescribed threshold value being smaller than said first prescribed threshold value;

respective means, comparing to a third prescribed threshold value each accumulation result from continuously accumulating a second number of digital words, for generating a trip signal whenever that said accumulation result exceeds said third prescribed threshold value, said third prescribed threshold value being smaller than said second prescribed threshold value; and means responding to any said trip signal being generated for providing said actuating signal.

* * * * *